United States Patent [19]
Lin

[11] Patent Number: 5,458,781
[45] Date of Patent: * Oct. 17, 1995

[54] BROMIDE SEPARATION AND CONCENTRATION USING SEMIPERMEABLE MEMBRANES

[75] Inventor: Kaung-Far Lin, Baton Rouge, La.

[73] Assignee: Ethyl Corporation, Richmond, Va.

[*] Notice: The portion of the term of this patent subsequent to Oct. 27, 2009 has been disclaimed.

[21] Appl. No.: 905,876

[22] Filed: Jun. 29, 1992

Related U.S. Application Data

[63] Continuation of Ser. No. 753,960, Sep. 3, 1991, Pat. No. 5,158,683.

[51] Int. Cl.$^6$ .................................................. B01D 61/00
[52] U.S. Cl. .................. 210/651; 210/652; 210/641; 423/504
[58] Field of Search .................................. 210/651, 652, 210/650, 906, 912, 681, 683, 641; 423/235, 497, 504, 507, 502

[56] References Cited

U.S. PATENT DOCUMENTS

| | | | |
|---|---|---|---|
| 3,479 | 1/1969 | Stieren | 423/504 |
| 3,505,216 | 4/1970 | Kryzer et al. | |
| 4,131,626 | 12/1978 | Sharma et al. | 423/502 |
| 4,141,825 | 2/1979 | Conger | 40/259 |
| 4,719,096 | 1/1988 | Lesher et al. | 423/504 |
| 4,723,603 | 2/1988 | Plummer | 166/275 |
| 4,725,425 | 2/1988 | Lesher et al. | 423/504 |
| 4,806,244 | 2/1989 | Guilhem | 210/638 |
| 4,872,984 | 10/1989 | Tomaschke | 264/45.5 |
| 4,872,991 | 10/1989 | Bartels et al. | 210/651 |
| 4,944,882 | 7/1990 | Ray et al. | 210/640 |
| 4,978,518 | 12/1990 | Lesher et al. | 423/504 |
| 4,981,594 | 1/1991 | Jones | 210/634 |
| 5,158,683 | 10/1992 | Lin | 210/651 |

FOREIGN PATENT DOCUMENTS 2221708  8/1988  United Kingdom.

OTHER PUBLICATIONS

*Desalination,* "Membrane Filtration for the Reuse of City Waster Water", 47, 257–265, (1982).
*Tappi Journal,* "Complete Effluent Recycling in the Bleach Plant with Ultrafiltration and Reverse Osmosis", Dorica, et al., 122–125, (1986).
*Enviromental Progress,* "Nanofiltration Extends the Range of Membrane Filtration", Peter Eriksson, vol. 7, No. 1, (1988).
*Desalination,* "Nanofiltration Membranes Broaden the Use of Membrane Separation Technology", Cadotte, et al., 70 77–88, (1988).
*Prog. Clin. Biol. Res.,* "Separation of Selected Organic and Inorganic Solutes by Low Pressure Reverse Osmosis", Bhattacharyya, et al., 292, 153–167, (1989).
Chemical Abstracts, vol. 67, Abstract No. 47370M 1967.
Chemical Abstracts, vol. 107, Abstract. No. 84930S, 1987.
Chemical Abstracts, vol. 114, Abstract. No. 130450 E, 1991.

*Primary Examiner*—Robert A. Dawson
*Assistant Examiner*—Ana M. Fortuna
*Attorney, Agent, or Firm*—Edgar E. Spielman, Jr.

[57] ABSTRACT

Aqueous solutions containing bromide and one or more polyvalent anions are separated by nanofiltration into two streams, a brine enriched in the bromide and a brine enriched in the polyvalent anion. The bromide-enriched brine can be concentrated using reverse osmosis, and the concentrated brine can be used, e.g., as feed to a process for recovering elemental bromine or for the production of metal bromide salt.

4 Claims, 2 Drawing Sheets

BROMIDE SEPARATION AND CONCENTRATION USING SEMIPERMEABLE MEMBRANES

This application is a continuation of application Ser. No. 07/753,960, filed Sep. 3, 1991, now U.S. Pat. No. 5,158,683.

This invention is in the field of water treatment. More particularly, this invention relates to the treatment of an aqueous salt solution containing bromide and other polyvalent anions to produce two brine streams. The brines are characterized in that one is enriched in bromide, and the other is enriched in the polyvalent anions. The brines are useful feedstocks for chemical processes.

BACKGROUND

Semipermeable membrane technology has seen increased application in recent years. Notable uses are in providing potable water from seawater, fractionating solutions containing macromolecular components, controlling the rate of drug release into the body, and removing urea and other toxins from the blood, i.e., with an artificial kidney.

The term "semipermeable membrane" implies that certain materials can pass through the membrane, while others cannot. Membranes and the processes which employ them are generally classified by the particle sizes of the materials which are retained by the membranes in passing a fluid through them.

Particles having a mean diameter greater than about 1 micron can be separated from a liquid carrier using gravity filtration through ordinary filter paper. On the other hand, particles smaller than about $10^{-3}$ microns, i.e., about 1–10 Angstroms (the size of simple anions and cations) can be separated from a liquid by reverse osmosis or "RO". Ultrafiltration separates particles larger than about $10^{-2}$ microns. In practical terms, proteins and viruses can be separated from an aqueous carrier by ultrafiltration.

Nanofiltration or "NF" is applicable to separate particles ranging from about $10^{-3}$ to $10^{-2}$ microns in size; that is, particles in a size range between those separable by reverse osmosis and ultrafiltration. The instant invention is concerned primarily with reverse osmosis and nanofiltration processes.

Reverse osmosis is described in numerous references such as, e.g., H. K. Lonsdale, "Reverse Osmosis," in "Synthetic Membranes, Science, Engineering and Applications," Ed. by Bungay, Lonsdale and dePinho, D. Reidel Publ. Co., Boston, Mass., 1986, pp 307–342. Cellulose acetate is an example of a typical RO membrane material.

Osmosis takes place when two different solutions are separated by an appropriate semipermeable membrane. The osmotic pressure across the membrane is directly proportional to the solute concentration difference between the two solutions, and the manifestation of osmotic pressure is diffusion of solvent from the more dilute solution, through the membrane, and into the more concentrated solution. Reverse osmosis, as the name implies, requires the application of external pressure to the more concentrated solution sufficient to overcome the osmotic pressure.

The result of such applied pressure, which can be as high as about $10^3$ psi, is to transfer solvent from the more concentrated solution, across the membrane and into the less concentrated solution; that is, reverse osmosis tends to produce a purified solvent stream on one side of the membrane and a more concentrated solution of the solute on the other side. In reverse osmosis, the solvent flux is directly proportional to the pressure in excess of the osmotic pressure which is applied to the solution, and the flux ultimately is limited on the high side by the mechanical capabilities of the equipment and/or membrane.

Reverse osmosis has been and is being employed around the world to produce potable drinking water from seawater and brackish waters. Seawater contains about 2–3 wt % total dissolved solids, about 50–100 ppm of which is bromide. Brackish water typically contains about ten-fold less total dissolved solids. RO is also used in the electronics industry to make ultra pure water for various processes, and RO is employed to clean industrial effluents. Obtaining the purified solvent resulting from RO has usually been the objective, and scant attention has been paid to any possible values derived from the concentrated solute solution produced on the other side of the membrane.

One instance in which the objective of the membrane process is the production of a concentrated solute solution is the treatment of cheese whey to concentrate it. At the same time, the whey is desalted. See A. G. Gregory, "Desalination of Sweet-Type Whey Salt Drippings for Whey Solids Recovery," Associated Milk Producers, Inc., North Central Region, Bulletin of the International Dairy Federation #212, 1987.

Nanofiltration, also called "loose reverse osmosis," employs a semipermeable membrane through which some solutes retained by a reverse osmosis membrane can readily pass; see, e.g., *Desalination*, 70, 77–88 (1988). Nanofiltration does not require pressures as high as those associated with reverse osmosis; pressures of about $10^2$ psi often suffice for nanofiltration, and such membranes can, as with RO membranes, be employed in water purification as disclosed in U.S. Pat. No. 4,981,594.

Certain nanofiltration membranes have the ability to discriminate between, not only particles of different size, but also particles of different charge sign and magnitude which will pass through the NF membrane. This discrimination can be explained in terms of the Donnan exclusion model; see Bhattacharyya, et al., *Prog. Clin. Biol. Res.*, 292, 153–167 (1989), for example.

The NF membranes of particular interest herein are membranes that discriminate between anions of different charge. Such membranes are described, for example, in U.S. Pat. No. 4,872,991 and can comprise the condensation product of a polyfunctional amine and a polyfunctional carboxylic component, i.e., a polyamide, which carries pendant —COO–groups. A commercially available membrane of this type is the NF-40 membrane available from FilmTec Corporation, Minneapolis, Minn. According to the Donnan model, the pendant carboxylate units on the surface of such a membrane repel those solute anions which diffuse to the membrane, and the degree of repulsion increases with increasing charge density of the anion, anions of higher charge density being repelled more strongly. This makes it possible for a nanofiltration unit to separate an aqueous stream containing NaCl and $Na_2CO_3$, into two separate streams, one enriched in NaCl and the other in $Na_2CO_3$, for example.

This ability of NF to separate anions by charge magnitude has been employed in the recovery of oil by injecting water into the oil-bearing formation, i.e., U.S. Pat. No. 4,723,603. The injection water is pretreated by NF to reject $SO_4^{-2}$ in the retentate and pass monovalent anions in the permeate, which is sent to the well, thus curtailing the precipitation of metal sulfates such as $BaSO_4$, $CaSO_4$, etc. downhole, which could plug the passageways in the formation. U.S. Pat. No. 4,806, 244 discloses a combined membrane/sorption process in which an NF membrane is used to separate $SO_4^{-2}$ and $NO_3^{-1}$ in a water stream. Similar applications for nanofiltration are described in *Environmental Progress*, 7, 58–62 (1988). Although the NF membrane process succeeds in separating monovalent anion from polyvalent anion, the NF membrane permeate generally is not as concentrated in monovalent anion as the feed to the membrane.

Several hybrid systems which combine either reverse osmosis or nanofiltration with a second separation process, such as pervaporation, coupled transport, etc. are described in U.S. Pat. No. 4,944,882. Combinations of reverse osmosis with another membrane process, i.e., ultrafiltration, are described in *Desalination*, 47, 257–265 (1983) and in *Tappi Journal*, 69, 122–125 (1986).

Processes employed in the chemical industry offer many opportunities for the use of semipermeable membrane technology in various purifications and related separations. A portion of the chemical industry is devoted to the recovery of elemental bromine from subterranean bromide-containing brines and in the manufacture and sale of brominated flame retardant additives for use in protecting flammable materials such as fabrics and plastics. Such flame retardant additives include, for example, decabromodiphenyl oxide and tetrabromobisphenol A.

A number of the brominated organic flame retardants are made by reacting an organic starting material with elemental bromine, producing bromides such as sodium bromide and hydrobromic acid as byproducts. These bromide-containing byproducts represent bromine values which have been difficult to recover and often are simply disposed of as waste by deep well injection. This bromide-containing waste could be recycled into an elemental bromine recovery process, e.g., as described in U.S. Pat. No. 4,978,518, except that these byproduct streams generally contain considerable amounts of soluble sulfate, sulfite, carbonate, phosphate and phosphite which, when combined with a subterranean brine, lead to intractable scale deposits in the processing equipment. The subterranean bromide brines generally are loaded with barium, calcium and strontium cations, whose sulfates, carbonates and phosphates are virtually insoluble in water.

SUMMARY OF THE INVENTION

Thus, it is an object of this invention to provide a process whereby extraneous aqueous bromide streams can be utilized as feed in a process for recovering elemental bromine. It is yet another objective of this invention to provide a method to recover the bromine values in streams which contain bromide, but which also contain polyvalent anions. It is a further objective to provide a method whereby sources of bromine, such as sea water and brackish water, can be treated to recover the bromine values therefrom. These and other objectives will become apparent hereinafter.

In attaining these objectives, this invention provides a process for separating an aqueous solution which contains bromide and one or more polyvalent anions into separate streams, one enriched in the bromide, the other enriched in polyvalent anion(s). The process comprises subjecting the aqueous solution to nanofiltration. An unexpected benefit of subjecting certain bromide-containing feed streams to nanofiltration is, not only segregation of monovalent anion, but also an increased monovalent anion concentration in the NF permeate as compared with the feed stream. It should be understood and is implied that, although the anion identities and concentrations are the ionic species of greatest interest in describing the invention, each anion carries with it an associated cation, such as $Na^{+1}$, $K^{+1}$, etc.

In preferred embodiments, either the aqueous stream is first treated by reverse osmosis prior to nanofiltration, or the bromide-enriched permeate from nanofiltration is subsequently treated by reverse osmosis to concentrate the bromide-containing stream. Although it will be apparent the invention can be practiced batch-wise, the most preferred embodiment of the invention is a continuous process.

The invention and the manner of practicing it will be clarified by reference to the drawings which accompany this specification and to the detailed description which follows.

DETAILED DESCRIPTION

The aqueous stream containing bromide and at least one polyvalent anion is not restricted as to its source. For example, the bromide-containing stream can be a waste stream from a manufacturing facility; it can be an extraneous water stream from a chemical production unit. Moreover, seawater or brackish water can be treated by the process of this invention.

The permissible concentrations of bromide, polyvalent anion, and monovalent anions other than bromide in the bromide-containing feed stream are limited by solubility considerations, of course. More importantly, the concentrations are limited on the high end by the mechanical characteristics of the equipment, especially the ability of the membrane material to withstand the pressure applied to it without blowing out or compressing so that poor separation results. Membrane materials are available which can be used under pressures as high as about 1000–1500 psig. A 15 wt% aqueous sodium bromide solution at room temperature (25° C.) exhibits an osmotic pressure of about 1000 psig. More generally, pressures no higher than about 400–500 psig are employed. There is no real limitation on the low end of salt concentrations which can be treated by the process of this invention; it simply becomes economically unattractive to do so if the input stream contains very little salt.

It is important that the bromide-containing feed stream not contain suspended solids which could foul the membrane or comprise a true emulsion or colloidal suspension. Consequently, the raw feed is generally passed through a filter capable of retaining particles larger than about 5 microns. With regard to temperature, the bromide-containing feed stream will generally have a temperature in the range of about 50° F. to about 110° F. As to pH, the pH of the feed stream will be adjusted, if necessary so that the hardware and the membrane are not attacked. The pH will usually be adjusted by the addition of mineral acid or caustic as necessary to reach a pH in the range of about 2–10.

In carrying out the process of this invention it may be desirable to carry out additional pretreatment of one sort or another on the aqueous bromide stream, depending upon its origin. For example, it may be desirable to soften the water, replacing $Ca^{+2}$ with $Na^+$, or to add an antiscalant.

Figure 1:
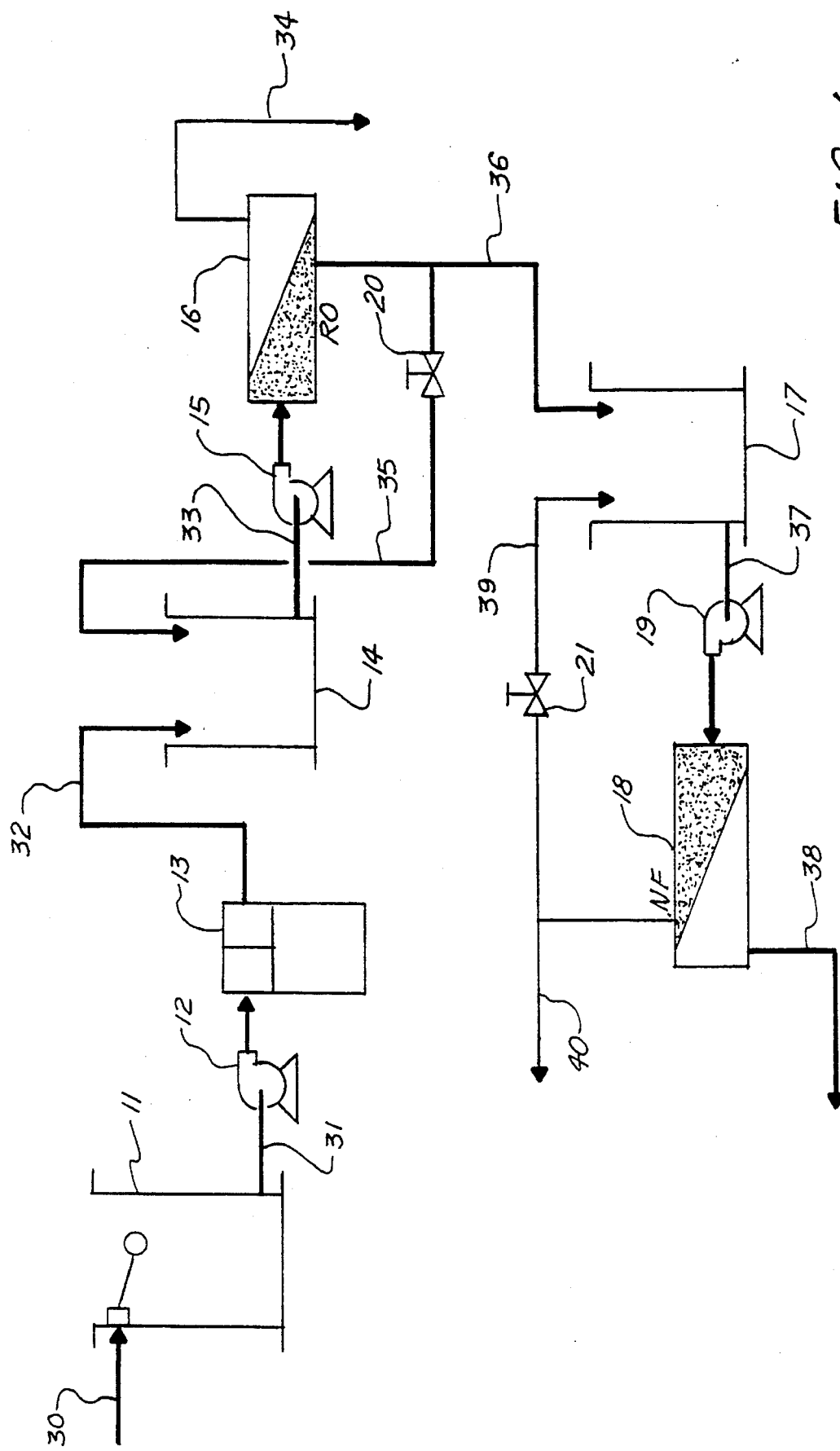
FIG. 1 is a flow diagram showing a preferred process for treating a bromide-containing stream, first by reverse osmosis, then by nanofiltration.

With reference now to FIG. 1, aqueous feed stream 30, which may have been pretreated and contains bromide and polyvalent anion, is introduced into feed tank 11 in which the feed can be further conditioned, if necessary, and the pH, temperature and other properties adjusted. The output stream 31 from tank 11 is transferred by means of pump 12 to a filter 13. Filter 13 can be selected from a number of different types, including cartridge or bag filters, the primary requirement being that particulate matter having a size larger than about 5 microns is removed from the stream. One particularly useful type of filter is a crossflow filter.

The filter output stream 32 preferably is led to tank 14, which is a surge tank and provides a pump head, but it should be understood that tank 14 will not always be necessary. Stream 33 from tank 14 is pressurized with pump 15. Pump 15 should be capable of attaining pressures as high as about $10^3$ psig. The pressurized output from the pump is led to the retentate side of reverse osmosis module 16.

The reverse osmosis module 16 will contain a feed input and two output lines, 34 for the permeate, and 36 for the retentate with an RO membrane separating the latter two. Such modules are available commercially from several suppliers. Suitable modules and membranes can be obtained from Hydranautics, San Diego, Calif., for example, and membrane 4040-LSY-CPA2 (see U.S. Pat. No. 4,872,984) gives satisfactory performance. It should be understood that it may be desirable to arrange several RO modules in series and/or parallel to handle the desired flow rate.

Permeate stream 34 from the RO module can be recycled as makeup water for many industrial processes. Alternatively, it can be discharged, without further treatment in most cases. The retentate stream 36 enters tank 17. As an option, stream 35 can be taken off retentate stream 36, permitting a portion of the retentate to be recycled through the RO module. Valve 20 controls the amount, if any, of the recycle. Adjusting the amount of recycle and increasing or decreasing the number of membrane modules can be employed to affect the split of the feed stream between permeate and retentate.

Output stream 37 from tank 17 is fed to pump 19 and thence to the retentate side of nanofiltration module 18. Pump 19 should be capable of pressures to about 500 psig, attainable by means of a pressure control valve or by changing the pump speed.

The nanofiltration module 18 will contain an input and two output lines, the latter separated by a nanofiltration membrane. The module is preferably spiral wound. It should be understood that several nanofiltration modules can be used in series and/or parallel to handle the flow rates desired. Both the modules and NF membranes are commercially available. Although a number of different membranes can be employed, one such membrane, Hydranautics 8040-LSY-PVD1, gives very good results. Other useful NF membranes include FilmTec XP45-4040, Hydranautics 4040-LSY-PVDI, and Desalination Systems Inc. DS-5 FRP-WRAP ROE membrane.

The retentate stream 40 from the nanofiltration module is enriched in the polyvalent anions and may be utilized for a utilitarian purpose or may be discarded as waste. In this regard, it should be borne in mind that the volume of waste here is much less than the volume of the waste if the process of this invention had not been performed. Provision can be made to recycle some of the retentate as stream 39 if desired; valve 21 can be included to control this.

The permeate stream 38 is enriched in bromide and other monovalent anions; it can be put to use, e.g., as feed to a bromine recovery process, or to the production of bromide salts, such as sodium bromide. For example, the nanofiltration permeate can be concentrated still further by removing water therefrom. This can be done by, e.g., heating to evaporate the water from and/or cooling the permeate to precipitate the metal bromide salt and thereafter separating the salt from the water.

Figure 2:
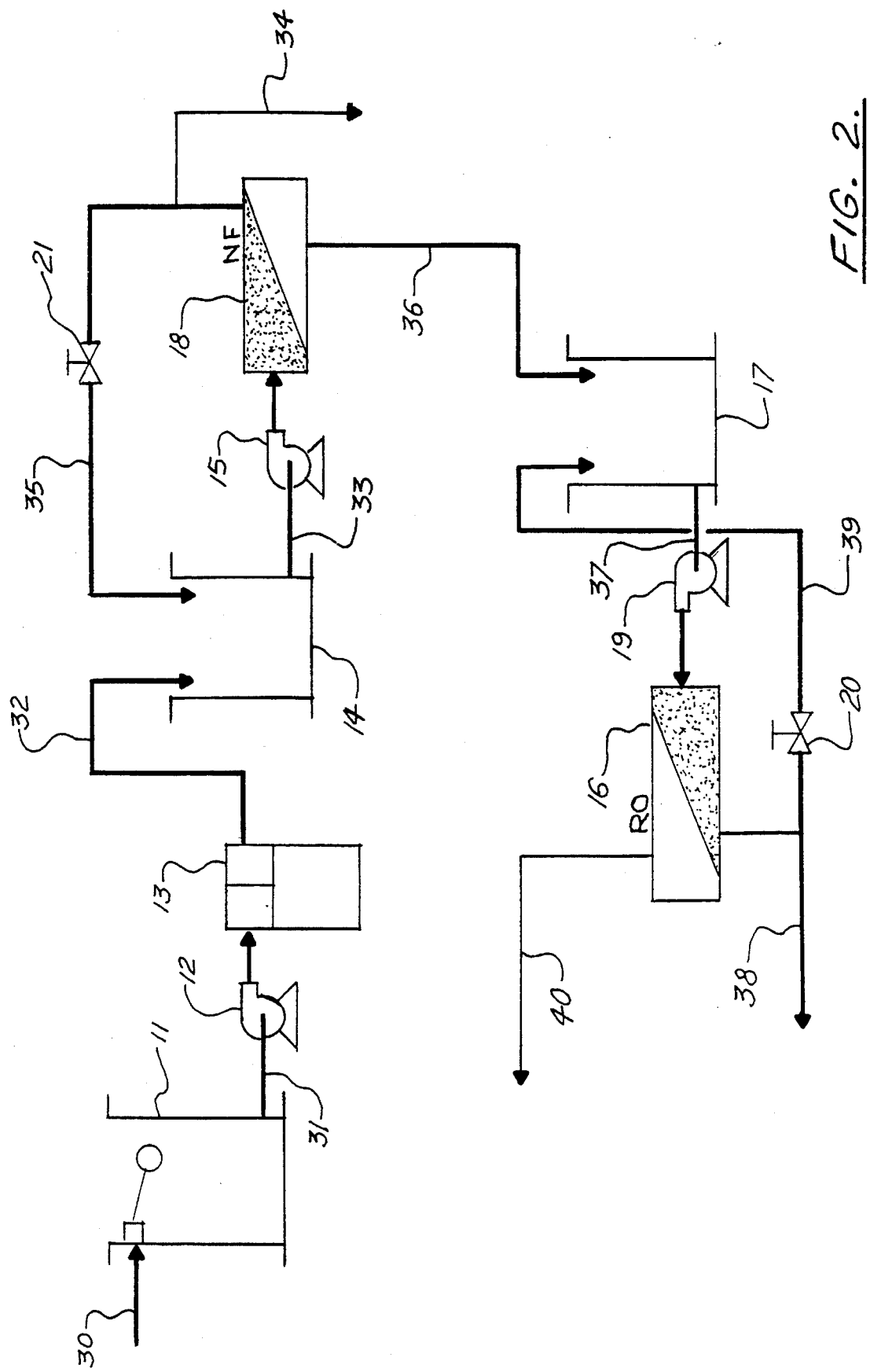
FIG. 2 is a flow diagram showing a preferred process for treating a bromide-containing stream, first by nanofiltration, then by reverse osmosis.

With reference now to FIG. 2, the process described in FIG. 2 is closely related to the process shown in FIG. 1. The difference is that the reverse osmosis and nanofiltration units are switched in the process of FIG. 2. In the latter, the output from pump 15 is fed to the retentate side of nanofiltration module 18, and the output stream 36 is taken from the permeate. Stream 34, which is enriched in polyvalent anion, can be discarded, or a portion thereof can be recycled as stream 35, the amount of recycle, if any, being controlled by valve 21.

Nanofiltration permeate stream 37 is led to the retentate side of reverse osmosis module 16. Retentate stream 38 is enriched in bromide, whereas permeate stream 40 is substantially salt-free and can be employed as process makeup water if desired. A portion of stream 38 can be recycled if desired as line 39, the amount of recycle being controlled by valve 20.

The choice as to which order to employ when both RO and NF are to be used depends primarily on the economics. If the input feed is relatively free of substances such as organics which would foul the membranes, it is probably preferable to employ the embodiment of FIG. 1, because less NF membrane surface is then required. On the other hand, if the feed does tend to foul the membrane, it is probably better to employ the embodiment of FIG. 2, because the dirty feed would then only see one set of membranes, even though more NF membrane surface would be required. The most economical arrangement is best determined by piloting the process over a period of time using the actual feed stream in both operation modes.

In carrying out the process of this invention, it is only necessary that the input aqueous bromide-containing stream be subjected to nanofiltration. The application of reverse osmosis in series with nanofiltration is optional, but preferred. In the event it is desired to treat the input stream by nanofiltration only, the process of FIG. 2 will be applicable, nanofiltration permeate stream 36 being the output product stream. The role of reverse osmosis in the process of this invention is primarily to concentrate the bromide-containing brine. This will be unnecessary in some instances; for example, when the input brine flow rate does not limit downstream processing capacity, or where a clean water byproduct stream cannot be utilized effectively.

In carrying out the process of this invention it may, in some instances, be desirable to employ additional nanofiltration and/or reverse osmosis systems in series with those shown in FIGS. 1 and 2. This may enhance the separation and concentration processes in bromide feed steams carrying very large amounts of dissolved salts. It may also be useful when pre-concentrating the bromide-containing feed stream to a specified bromide level for sale as a solution, or to reduce solvent removal cost when sold as a solid.

The process of this invention will be clarified still further by reference to the following Examples, which are intended to illustrate application of the invention. It is not intended that the invention be limited to the process as so exemplified.

EXAMPLE 1

Reverse Osmosis of Feed Stream (FilmTec FT-30 BW 2540 Membrane)

Using the equipment configuration illustrated in FIG. 1, the feed stream 30 from a bromide-containing brine source, the primary components of which are listed in Table 1, is led at a pressure of about 400–600 psig to a reverse osmosis module 16 equipped with a FilmTec FT-30 BW 2540 membrane. At a pressure of 395 psig the flux, i.e., stream 34, is 12 gal/ft$^2$/day at 73° F. Upon increasing the pressure to 600 psig the flux increases to 21 gal/ft$^2$/day. The separation effected at the RO element is set forth in Table 1, where the retentate, i.e., stream 36, is 53 vol % of input stream 30, or a volume reduction of 47%. The RO permeate, stream 34, is of high quality, containing very low concentrations of dissolved solids, especially scalants such as calcium sulfate and calcium carbonate, and can be used as make-up water for various plant purposes.

TABLE I

Reverse Osmosis Treatment of Feed Stream

| Component[a] | Input Stream (mg/L) | RO Retentate (mg/L) | RO Permeate (mg/L) |
|---|---|---|---|
| TDS | 13000 | | |
| TSS | 100 | | |
| TOX | 16 | | |
| TOC | 200 | | |
| pH | 9.14 | | |
| Alkali (as CaCO$_3$) | 910 | 1700 | |
| Fluoride | 0.37 | 0.63 | 0.03 |
| Chloride | 290 | 590 | <0.4 |
| Bromide | 3600 | 7100 | 21 |
| Nitrate (as N) | <0.2 | | |
| Nitrite (as N) | <0.2 | | |
| Sulfate | 4500 | 9200 | — |
| Sodium | 3500 | 7100 | 8.6 |

[a]Major components only

EXAMPLE 2

Nanofiltration of RO Retentate Stream (FilmTec XP45-4040 Membrane)

Retentate stream 36 from Example 1 is fed to nanofiltration module 18, which contains a FilmTec NF membrane XP45-4040. At a pressure of about 200 psig the flux is about 13 gal/ft$^2$/day. At a volume reduction of about 78% based on feed stream 36, the separations effected at the NF unit appear in Table II.

TABLE II

Nanofiltration Treatment of RO Retentate

| Component[a] | NF Feed (mg/L) | NF Retentate (mg/L) | NF Permeate (mg/L) |
|---|---|---|---|
| Fluoride | 0.63 | 0.45 | 0.72 |
| Chloride | 590 | 270 | 720 |
| Bromide | 7100 | 2700 | 8500 |
| Sulfate | 9200 | 31000 | 230 |
| Sodium | 7100 | 20000 | 3500 |

[a]Major components only

EXAMPLE 3

Nanofiltration of Feed Stream (FilmTec XP45-4040 Membrane)

Using the equipment configuration illustrated in FIG. 2, the feed stream 30 from a bromide-containing brine source, the same source used in Example 1, primary components of which are listed in Table III, is led to nanofiltration module 18, which contains a FilmTec XP45-4040 membrane. At a volume reduction of about 88% based on feed stream 30, the separations effected are set forth in Table III.

TABLE III

Nanofiltration Treatment of Feed Stream

| Component[a] | Input Stream (mg/L) | NF Retentate (mg/L) | NF Permeate (mg/L) |
|---|---|---|---|
| Fluoride | 0.37 | 0.27 | 0.4 |
| Chloride | 290 | 86 | 350 |
| Bromide | 3600 | 410 | 4100 |
| Nitrate (as N) | <0.2 | <1 | <1 |
| Nitrite (as N) | <0.2 | <1 | <1 |
| Sulfate | 4500 | 38000 | 140 |
| Sodium | 3500 | 20000 | 1700 |

[a]Major components only

It should be noted that in each of the Examples the bromide concentration of the product stream i.e., the RO retentate in Example 1 and the NF permeate streams in Examples 2 and 3, is increased over that in the feed stream. The latter is unexpected and appears to occur when the feed stream is high in sulfate content, i.e., greater than about 10$^3$ mg/L, and such streams are preferred as bromide feed streams in the practice of this invention.

It will be evident that this invention is not limited to the process as set forth in the aforesaid specific embodiments. Instead, the intended scope of the invention is set forth in the following claims.

What is claimed is:

1. A process for recovering a concentrated metal bromide solution from an aqueous solution containing both monovalent bromide anion and one or more polyvalent anions, said process comprising passing said aqueous solution through at least one reverse osmosis system and through at least one nanofiltration system in either order, thereby producing four streams; (1) a reverse osmosis permeate stream and (2) a reverse osmosis retentate stream, which reverse osmosis permeate stream contains water substantially free of salt and which reverse osmosis retentate stream contains concentrated metal bromide solution; (3) a nanofiltration retentate stream and (4) a nanofiltration permeate stream, which nanofiltration retentate stream contains brine enriched in polyvalent anions and which nanofiltration permeate stream contains a concentrated metal bromide solution.

2. The process of claim 1 which further comprises recovering bromine from said concentrated metal bromide solution.

3. The process of claim 1 wherein said aqueous solution is seawater.

4. In a process for producing elemental bromine from a bromide-containing brine by treating the brine with chlorine, the improvement therein which comprises (a) first passing said bromide-containing brine through at least one reverse osmosis system and through at least one nanofiltration system in either order, thereby producing four streams; (1)

a reverse osmosis permeate stream and (2) a reverse osmosis retentate stream, which reverse osmosis permeate stream contains water substantially free of salt and which reverse osmosis retentate stream contains concentrated metal bromide solution; (3) a nanofiltration retentate stream and (4) a nanofiltration permeate stream, which nanofiltration rentenate stream contains brine enriched in polyvalent anions and which nanofiltration permeate stream contains concentrated metal bromide solution; and (b) adding to said bromide-containing brine, the concentrated metal bromide solution obtained in step (a).

* * * * *

UNITED STATES PATENT AND TRADEMARK OFFICE
CERTIFICATE OF CORRECTION

PATENT NO. : 5,458,781

DATED : October 17, 1995

INVENTOR(S) : Kaung-Far Lin

It is certified that error appears in the above-identified patent and that said Letters Patent is hereby corrected as shown below:

Cover page, item [73] Assignee:, reads "Ethyl Corporation, Richmond, Va." and should read — Albemarle Corporation, Richmond, Va.—.

Signed and Sealed this

Tenth Day of September, 1996

Attest:

BRUCE LEHMAN

Attesting Officer

Commissioner of Patents and Trademarks